United States Patent
Bar-Yaakov et al.

(10) Patent No.: US 8,991,321 B2
(45) Date of Patent: Mar. 31, 2015

(54) FLAME RETARDED COMPOSITIONS

(75) Inventors: Yoav Bar-Yaakov, Lehavim (IL); Yaniv Hirschsohn, Rehovot (IL); Ita Finberg, Beer Sheva (IL); Pierre Alexandre Georlette, Omer (IL)

(73) Assignee: Bromine Compounds Ltd., Be'er Sheva (IL)

( * ) Notice: Subject to any disclaimer, the term of this patent is extended or adjusted under 35 U.S.C. 154(b) by 316 days.

(21) Appl. No.: 13/517,292

(22) PCT Filed: Dec. 23, 2010

(86) PCT No.: PCT/IL2010/001082
§ 371 (c)(1),
(2), (4) Date: Aug. 1, 2012

(87) PCT Pub. No.: WO2011/077439
PCT Pub. Date: Jun. 30, 2011

(65) Prior Publication Data
US 2012/0309869 A1    Dec. 6, 2012

Related U.S. Application Data

(60) Provisional application No. 61/290,048, filed on Dec. 24, 2009.

(51) Int. Cl.
*B65D 19/00* (2006.01)
*C09K 21/08* (2006.01)
*C09K 21/14* (2006.01)
*C08L 23/06* (2006.01)
*C08L 63/02* (2006.01)
*C08K 3/22* (2006.01)
*C08K 5/00* (2006.01)
*C08K 5/04* (2006.01)
*C08K 5/5337* (2006.01)
*C08L 63/00* (2006.01)

(52) U.S. Cl.
CPC .............. *C08K 3/2279* (2013.01); *C08K 3/22* (2013.01); *C08K 5/0066* (2013.01); *C08K 5/04* (2013.01); *C08K 5/5337* (2013.01); *C08L 23/06* (2013.01); *C08L 63/00* (2013.01)
USPC ........ 108/51.11; 252/609; 525/107; 525/108; 525/115; 525/120; 525/527; 525/529

(58) Field of Classification Search
None
See application file for complete search history.

(56) References Cited

U.S. PATENT DOCUMENTS

| | | | |
|---|---|---|---|
| 4,128,709 A | 12/1978 | Vollkommer et al. | |
| 4,605,708 A | 8/1986 | Yaacov et al. | |
| 4,996,276 A | 2/1991 | Fishler | |
| 5,705,544 A | 1/1998 | Finberg et al. | |
| 5,837,799 A * | 11/1998 | Chen et al. | 528/102 |
| 5,845,588 A | 12/1998 | Gronnevik | |
| 6,352,039 B1 | 3/2002 | Woods et al. | |
| 6,627,690 B1 | 9/2003 | Hironaka | |
| 6,849,677 B2 | 2/2005 | Overholt | |
| 2001/0044488 A1* | 11/2001 | Yasuda et al. | 524/341 |
| 2006/0148948 A1* | 7/2006 | Bar-Yaakov et al. | 524/380 |
| 2007/0000415 A1* | 1/2007 | Moore, Jr. | 108/51.11 |
| 2007/0129502 A1 | 6/2007 | Kawabe et al. | |

FOREIGN PATENT DOCUMENTS

| | | | |
|---|---|---|---|
| EP | 467364 | 10/1996 | |
| EP | 0855421 | 4/2004 | |
| EP | 1587865 | 9/2006 | |
| WO | WO99/07787 | 2/1999 | |
| WO | WO01/75011 | 10/2001 | |
| WO | WO02/074847 | 9/2002 | |
| WO | WO 2010023236 A1 * | 3/2010 | C08L 23/10 |

OTHER PUBLICATIONS

Montezin et al., "Flame Retardant and Mechanical Properties of a Copolymer PP/PE Containing Brominated Compounds/Antimony Trioxide Blends and Magnesium Hydroxide or Talc," Fire and Materials, 21: 245-252, 1997.
Reznik et al., "Optimization of Flame Retarded Thermoplastics for Engineering Applications," Flame Retardants, Interscience Communications, 125-137, 1998.
Smith et al., "Beneficial Effects of Brominated Flame Retardants in Polymeric Systems," Flame Retardants, Interscience Communications, 79-90, 1996.
Written Opinion for PCT/IL10/01082, mailed Mar. 29, 2011.

* cited by examiner

*Primary Examiner* — Michael J Feely
(74) *Attorney, Agent, or Firm* — Choate, Hall & Stewart, LLP; Charles E. Lyon; Kevin M. Henry (57) ABSTRACT

The invention relates to a polyethylene composition comprising a mixture of flame retardants which are bromine-containing polymers. The polyethylene composition is useful in the manufacture of pallets. A process for making the polyethylene composition through a masterbatch route is also disclosed.

8 Claims, 1 Drawing Sheet

FLAME RETARDED COMPOSITIONS

The invention relates to the use of bromine-containing polymers with different molecular weights for reducing the flammability of polyethylene compositions, in particular polyethylene compositions formed into pallets.

Plastic pallets are used for the shipment and transport of goods. Plastic pallets are lightweight, strong and rigid, and may be easily cleaned, and therefore they may be advantageously used in place of wooden pallets.

It has been proposed in the art to add flame retardants to polyolefin compositions used for the manufacturing of pallets. U.S. Pat. No. 6,849,677 describes the combination of tetrabromobisphenol A (or a derivative thereof, known as FR-720), antimony trioxide and alumina trihydrate for reducing the flammability of pallets.

The present invention relates to the flame retardation of polyethylene, in particular polyethylene pallets, using a bromine-containing polymer which is poly (pentabromobenzyl acrylate), described for the first time in U.S. Pat. No. 4,128,709. The aforementioned patent illustrates the polymerization of the monomer pentabromobenzyl acrylate in an organic solvent to form the polymer (oligomer) product, which is represented by the following formula (wherein p indicates the degree of polymerization):

According to Example 1 of U.S. Pat. No. 4,128,709, the polymerization product has a melting point in the range between 205 and 215° C. and bromine content of approximately 71%. Poly (pentabromobenzyl acrylate) can also be produced by melt, polymerization, as described in U.S. Pat. No. 4,996,276. The product is also commercially available (FR-1025 manufactured by ICL IP, Israel).

In the aforementioned patent U.S. Pat. No. 4,128,709, poly (pentabromobenzyl acrylate) was tested for its flame retarding action in various polymers, including polyolefin. To this end, a blend of 12 wt % of poly (pentabromobenzyl acrylate) and 5 wt % of antimony trioxide was added to polypropylene or polyethylene. Blends of poly (pentabromobenzyl acrylate) and antimony trioxide were later incorporated in a copolymer of polypropylene and polyethylene [Montezin et al., Fire and Materials, Vol. 12, p. 245-252 (1997)] and in homo polypropylene [Reznik et al., Flame retardants 98 Interscience Communications pp. 125-137; Smith et al. Flame Retardants 96 Interscience Communications pp. 79-90].

The present invention also relates to the flame retardation of polyethylene, in particular polyethylene pallets, using the class of bromine-containing flame retardants obtainable by reacting tetrabromobisphenol A with epichlorohydrin. The reaction of tetrabromobisphenol A with epichlorohydrin is known to yield various reactive brominated epoxy oligomers and polymers having high bromine content, which may be used as such, or in the form of their end-capped derivatives, as flame retardants in plastic materials.

Brominated epoxy polymers were mentioned in the art for polyolefin applications. WO 99/07787 discloses a composition comprising polyolefin base and a brominated epoxy oligomer. U.S. Pat. No. 5,705,544 discloses fire-retarded polypropylene and ethylene-propylene copolymers which contain brominated epoxy resin having an average molecular weight of at least 3,000 g/mol. WO 01/75011 discloses that a bromine-containing epoxy oligomer with an average molecular weight of 1,000-50,000 g/mol is used in polyolefin in combination with a second brominated flame retarding agent which is a monomeric or dimeric flame retardant containing aliphatic bromine. JP 11-278485 describes a pallet made of a polyolefin, which contains a blend of a brominated epoxy resin, a second flame retardant which is preferably decabromodiphenylethane and antimony trioxide. The working examples of JP 11-278485 appear to illustrate the use of a brominated epoxy resin having an average molecular weight of 10000 g/mol.

It has now been found that low molecular weight bromine-containing polymers [such as poly(pentabromobenzyl acrylate), or a brominated epoxy resin having molecular weight of less than 5,000 g/mol, or the end-capped derivatives of said epoxy resin], when added at a relatively low concentration to high density polyethylene (HDPE), together with a small quantity of an inorganic synergist such as antimony trioxide, may be used to form compositions which can be processed (e.g., by injection molding) to make pallets which exhibit a satisfactory level of reduced flammability, despite the low bromine content of the polyolefin. It was also found that when one or more medium or high molecular weight brominated epoxy polymers are added to the polyethylene composition, together with one (or both) of the low-molecular weight bromine containing polymers set forth above, then the compositions exhibit reduced burning times and virtually no migration of the flame retardants to the surface of the polymer ("blooming"). The compositions were tested for surface migration under severe storage conditions by being maintained at 70° C. for one week or even for a longer period, and then visually observed for surface migration of the flame retardants. Another advantage offered by the combination of a medium/high molecular weight brominated epoxy with the low-molecular weight bromine containing polymers relates to the possibility of producing a concentrate of the flame retardants (a masterbatch composition), allowing the flame retardants to be conveniently incorporated into the polyethylene, as discussed in more detail below.

The low molecular weight bromine-containing polymers suitable for use according to the invention are selected from the group consisting of poly(pentabromobenzyl acrylate) and brominated epoxy resins and end-capped derivatives thereof, wherein said brominated epoxy resins and their end-capped derivatives are represented by Formula (I):

wherein m is the number average degree of polymerization and is in the range between 0.4 and 7.2, and more preferably between 1 and 6, and R₁ and R₂ are independently selected from the group consisting of the following monovalent radicals:

The epoxy-terminated flame retarding agent represented by Formula (I) has an average epoxy equivalent weight of not more than 2500 g/eq (wherein m equals 7.2), and more preferably of not more than 2200 g/eq (wherein m equals 6). The epoxy equivalent weight (EEW) is defined as the molecular weight of the substance divided by the number of epoxy groups contained therein, and may be measured by methods known in the art (e.g., "Encyclopedia of polymer science and engineering" John Wiley & Sons, Vol. 6 (1986)). F-2016 manufactured by ICL-IP is an example of a commercially available flame retardant of Formula (I), having an average molecular weight of 1600 g/mol.

The medium/high molecular weight bromine-containing polymers suitable for use according to the invention include brominated epoxy polymers represented by Formula I above, but with a molecular weight ranging between 15,000 and 70,000, which corresponds to an average weight degree of polymerization m between 24 and 115. Also included are the end-capped derivatives. Examples of commercially available medium/high molecular weight brominated epoxy resins (or their end-capped derivatives) which are suitable for use include F-2100, F-3100, F-2300H and F-2400 ex ICL-IP.

The present invention is therefore primarily directed to a polyethylene composition comprising high density polyethylene and a mixture of flame retardants which are bromine-containing polymers, said mixture comprising:

(i) at least one low-molecular weight bromine-containing polymer selected from the group consisting of poly(pentabromobenzyl acrylate) and brominated epoxy resins and their end-capped derivatives represented by Formula (I):

wherein m, the number average degree of polymerization, is between 0.4 and 7.2, and R₁ and R₂ are independently selected from the group consisting of (ii) one or more medium or high molecular weight brominated epoxy polymers and their end-capped derivatives represented by Formula I:

wherein m, the weight average degree of polymerization, is between 10 and 115, and R₁ and R₂ are independently selected from the group consisting of and (iii) an inorganic flame retardant synergist.

Preferably, the bromine content of the polyethylene composition is not more than 7% (w/w), and the concentration of the inorganic synergist in said composition is not more than 4% (w/w). The bromine content of the polyethylene composition may vary between 1 and 7%, for example, between 2.5 and 7% (w/w), and the concentration of the inorganic synergist (e.g., antimony trioxide) may be between 0 and 4%, for example, between 0.5 and 3% (w/w). Throughout the description, all percentages are by weight, relative to the total weight of the composition, unless otherwise indicated.

The flame retardants of Formula (I), which are suitable for reducing the flammability of polyethylene compositions according to the invention, can be prepared by methods known in the art (e.g., U.S. Pat. No. 4,605,708, EP 467364 and EP 1587865).

For example, the epoxy-terminated flame-retardants of Formula (I) may be produced by reacting tetrabromobisphenol A with epichlorohydrin, optionally in an inert solvent such as toluene or methyl isobutyl ketone, in the presence of a base (e.g., an aqueous solution of sodium hydroxide) under heating. Following phase separation, the organic phase, which contains the product, is washed with water to remove residual salts therefrom and the product is finally recovered by removing the organic solvent. The average epoxy equivalent weight of the product may be controlled by modifying the ratio of the reactants. The lower the concentration of epichlorohydrin used, the higher the epoxy equivalent weight of the resulting mixture.

For example, the tribromophenol-terminated end-capped flame retardants of Formula (I) can be prepared by reacting the mixture of epoxy resins of Formula (I) with tribromophenol, possibly in a solvent. The reaction is carried out under heating in the presence of a catalyst (e.g., Li based catalyst) or an inorganic base, such as sodium hydroxide or potassium hydroxide, or an organic base, such as tertiary amine, quaternary ammonium salt or a quaternary phosphonium salt.

As noted above, for the purpose of the present invention, the flame retardants of Formula (I) are classified into two subgroups:

1) Low molecular weight brominated epoxy oligomers (LMW-BE) and their end-capped derivatives, with an average molecular weight between 900 and 5000 g/mol.

2) High molecular weight brominated epoxy polymers (HMW-BE) and their end-capped derivatives, with an average molecular weight between 10,000 and 70000 g/mol, e.g. 15,000-70,000.

Preferred LMW-BE flame retarding agents falling within the scope of Formula (I) above include the epoxy-terminated resins represented by the following Formula (Ia):

wherein m, the number average degree of polymerization, is in the range between 0.4 and 7.2. More specifically, the epoxy-terminated flame retarding agent represented by Formula (Ia) has an average epoxy equivalent weight in the range between 450 and 2500. The LMW-BE flame retarding agent of Formula (Ia) is typically in the form of a mixture comprising the following individual brominated epoxy-terminated compounds:

(Ia-1) the monomer of tetrabromobisphenol A diglycidyl ether, as shown by Formula (Ia-1):

The epoxy equivalent weight of the monomer is 328 g/eq.

(Ia-2) the dimer of tetrabromobisphenol A diglycidyl ether, as shown by Formula (Ia-2):

The epoxy equivalent, weight of the dimer is 628 g/eq.

(Ia-3) the trimer of tetrabromobisphenol A diglycidyl ether. The epoxy equivalent weight of the trimer is 928 g/eq. Higher order oligomers are also be present in the mixture.

Preferred HMW-BE flame retarding agents falling within the scope of Formula (I) above include the epoxy-terminated resins represented by the Formula (Ia):

wherein m, the weight average degree of polymerization, is in the range between 24 and 115. More specifically, HMW-BE flame retardants represented by Formula (Ia) has an average epoxy equivalent weight greater than 4000.

Preferred HMW-BE flame retarding agents falling within the scope of Formula (I) above include the tribromophenol end-capped resins represented by Formula (Ib):

wherein m, the weight average degree of polymerization, is in the range between 10 and 80.

Particularly preferred flame retardants of Formula I (e.g., of Formulas Ia and Ib), which are suitable for use according to the invention are tabulated below:

| Description | Commercial source |
| --- | --- |
| Low molecular weight brominated epoxy or end-capped derivatives | |
| Brominated epoxy polymer average molecular weight 1000 g/mol | F-2001 (ICL-IP) |
| Brominated epoxy polymer average molecular weight 1600 g/mol | F-2016 (ICL-IP) |
| End-capped brominated epoxy polymer average molecular weight 2000 g/mol | F-3020 (ICL-IP) |
| Medium/High molecular weight brominated epoxy or end-capped derivatives | |
| End-capped brominated epoxy polymer average molecular weight 15000 g/mol | F-3100 (ICL-IP) |

| Description | Commercial source |
| --- | --- |
| Brominated epoxy polymer average molecular weight 20000 g/mol | F-2100 (ICL-IP) |

| Description | Commercial source |
| --- | --- |
| Brominated epoxy polymer average molecular weight 40000 g/mol | F-2400 (ICL-IP) |

A preferred mixture of low molecular weight bromine-containing polymers and high molecular weight bromine-containing polymers to be used according to the invention is either a ternary or a quaternary mixture comprising (in terms of weight percent relative to total weight of the FR mixture):

(a) From about 1 to 80% poly (pentabromobenzyl acrylate), preferably from about 2 to 70% (e.g., FR-1025);

(b) From about 3 to 80% low molecular weight brominated epoxy of Formula (Ia):

with an average molecular weight between 900 and 5000, preferably from about 1250 to 3000 (e.g., F-2016);
(c) From about 3 to 80% high molecular weight brominated epoxy of Formula (Ia):

with an average molecular weight between 10,000 and 70,000, preferably from about 13,000 to 65,000 (e.g., F-2400); and/or
(d) From about 0 to 70% high molecular weight tribromophenol end-capped resins represented by Formula (Ib):

with an average molecular weight between 10,000 and 50,000, preferably from about 11,000 to 40,000 (e.g., F-3100);

Hereinafter, a mixture of flame-retardants comprising the four flame retardants identified in (a), (b), (c) and (d) is designated "quaternary mixture", whereas a mixture of flame-retardants comprising only three components, e.g., (a), (b) and (c), is designated "ternary mixture". The ternary mixtures include mixtures of (a), (b) and (c); (a), (b) and (d); (a), (c) and (d); and (b), (c) and (d). It has been found that the ternary or quaternary mixtures of the invention are effective in improving the flammability properties of polyethylene, exhibiting virtually no surface migration onto the polyethylene surface. In addition, the ternary or quaternary mixtures can be conveniently employed in the form of a concentrate by being processed into masterbatch pellets, optionally in the presence of a carrier, as described below. The ternary and quaternary mixtures, in particular in the form of concentrate (e.g., pellets), constitute additional aspects of the invention. The term "binary mixture" refers to a mixture comprising one of (a) or (b), together with one of (c) or (d).

The cone calorimeter and the UL-94 vertical and horizontal burn tests were used for the quantitative flammability analysis of the polyethylene compositions set forth above. It was found that despite their low bromine content, the compositions display a satisfactory level of fire resistance. Briefly, in the cone calorimeter, a radiant heat is projected onto a sample before ignition and during burning of the sample, and several parameters, such as time to ignition and the heat release profile of the tested sample are measured. The UL-94 vertical test applies a flame twice under a vertically positioned sample for ten seconds, followed by a time measurement to extinguishment after each flame application. The cone calorimeter and UL-94 tests are described in more detail in the experimental section below. The data collected by the flammability tests indicates that it is possible to enhance the flame retardancy of the polyethylene composition (e.g., HDPE), while maintaining good mechanical properties of same, when poly(pentabromobenzyl acrylate) and/or the brominated epoxy resin of Formula (I) are added to the polyolefin in an amount sufficient to provide a bromine concentration within the moderate range noted above, combined with only a small quantity of the antimony trioxide synergist. It should be noted that inferior flame resistance has been observed, when corresponding amounts in terms of bromine of flame retardants such as decabromodiphenyl oxide and decabromodiphenyl ethane (commercially available as FR-1210 and Saytex®-8010 from ICL-IP and Albemarle Corporation, respectively) were used.

The formulation comprises at least one polyethylene, which is preferably HDPE. More preferably, the high density polyethylene has a density greater than 0.94 g/cm$^3$ and a melt index (190° C./2.16 kg; ASTM D1238) greater than 0.3 g/10 min, and preferably greater than 0.8 g/10 min. The concentration of the polyethylene in the formulation is not less than 60%, and may be between 70 and 98%, preferably between 75 and 95%. As explained above, the brominated flame retardant(s) are added to the formulation at a concentration sufficient for adjusting the bromine content within the range indicated above. It is not mandatory that this bromine content be supplied in its entirety by the bromine-containing polymers mentioned above, and one or more additional brominated flame retardants may be added to the formulation. However, preferably, the mixture of brominated flame retardants incorporated into the polyethylene according to the invention consists of bromine-containing polymers, said mixture being free of brominated compounds such as decabromodiphenyl oxide or decabromodiphenyl ethane.

The compositions of the invention may be prepared as follows. The various ingredients of the composition are blended together according to their respective amounts. Generally, the ingredients are first dry blended using suitable mixing machines, or may be dosed directly into the extruder. The powder mixture may then be processed and compounded to form homogeneous pellets, for example, by using a twin-screw extruder. The pellets obtained are dried, and are suitable for feed to an article shaping process such as injection or extrusion molding. Process parameters are described in more detail in the examples that follow.

As an alternative to the use of the flame retardants in the form of a powder mixture, the masterbatch route can be employed. For example, either the poly(pentabromobenzyl acrylate) or the low molecular weight brominated epoxy resin as defined by Formula (I), and preferably both, may be incorporated into the polymeric formulation via a masterbatch form (which may optionally contain the antimony trioxide). A masterbatch is a concentrate composition comprising a suitable carrier, and a relatively high proportion of the flame retardant(s). Typically, the carrier is a polymer which is intended to facilitate the mixing of the masterbatch and improve the compatibility of the masterbatch and the blend polymer (the blend polymer is the polymer combined with the masterbatch; in the present case, the blend polymer is polyethylene). Another advantage resulting from using the masterbatch is that it is made of dust free pellets, and is hence environmentally friendly. Suitable carrier polymers applied in the masterbatch are therefore compatible (e.g., similar or identical) with the blend polymer. However, it was found that it is possible to prepare a masterbatch containing poly(pentabromobenzyl acrylate) and/or the low molecular weight brominated epoxy of Formula (I), in combination with a carrier material comprising brominated epoxy polymer or end--capped brominated epoxy, but with a high average molecular weight, say more than 15,000 g/mol, as identified above. As an example of a suitable carrier material, a brominated epoxy with a molecular weight of 40,000-60,000 g/mol may be used, such as F-2400, which is commercially available from ICL-IP.

Thus, in one embodiment, the masterbatch of the invention comprises a combination of brominated flame retardants and optionally antimony trioxide, e.g., the masterbatch concentrate comprises the binary, ternary or quaternary mixtures described above. The concentrations of the poly(pentabromobenzyl acrylate), the low molecular weight brominated epoxy of Formula (Ia), the high molecular weight brominated epoxy of Formula (Ia) and the high molecular weight tribromophenol end-capped resin of Formula (Ib) in the masterbatch are in the ranges between 1-75%, 3-75%, 3-80% and 0-70%, respectively. If antimony trioxide is incorporated in the masterbatch, then its concentration may be between 0 and 30%. Other additives may also be included in the masterbatch, including inert carriers such as HDPE or other polyolefins at a concentration in the range of 3 to 40%. The bromine content of the masterbatch is not less than 15%, and preferably not less than 20%, e.g., not less than 30% (for example, between 15-70%).

The invention therefore also relates to a process for preparing a polyethylene composition suitable for the manufacture of pallets, as set out above, which process comprises: providing a masterbatch which comprises a mixture of bromine-containing polymers as described above (namely, binary, ternary or quaternary mixture), wherein said masterbatch optionally further comprises an inert polymer carrier compatible with polyethylene and an inorganic synergist; and compounding said masterbatch with polyethylene, and optionally also with said synergist if the latter is not present in said masterbatch, to form the polyethylene composition, in which the bromine content is preferably in the range between 1 and 7% and the inorganic synergist (e.g., antimony trioxide) concentration is in the range between 0 and 4%. The masterbatch preferably comprises the ternary or quaternary mixtures identified above.

In addition to the polyethylene, the mixture of bromine-containing polymers which function as flame retardants, the inorganic synergist (e.g., antimony trioxide), the composition of this invention may contain conventional ingredients, such as fillers, smoke-suppressants, glass reinforcement, impact modifiers, pigments, UV stabilizers, heat stabilizers, lubricants, carbon black and antioxidants. The concentration of each of the additives listed above is typically in the range between 0 and 30 wt %. These additives may be also included in the masterbatch and incorporated into the HDPE through the masterbatch route.

The aforementioned polyolefin compositions, prepared either by combining and processing the separate components in an extruder or via the masterbatch route, as described above, are suitable for use in the manufacture of a pallet, or parts of a pallet (such as a bottom deck board, a top deck board, the stringers). Single-decked pallets, double-decked pallets, wing pallets and box pallets can be fabricated by injection molding the polyolefin compositions of the invention, to produce the individual structural components of the pallet, which are subsequently joined together. Methods other than injection molding may be used for fabricating the pallets. Different types of pallets and methods for manufacturing same are described, for example, in U.S. Pat. No. 5,845,588 and U.S. Pat. No. 6,352,039. A pallet having at least one structural component comprising polyethylene (e.g., HDPE), wherein the polyethylene contains a flame retardant which is a low-molecular weight bromine-containing polymer selected from the group consisting of poly(pentabromobenzyl acrylate) and a brominated epoxy resin of Formula (I); and an inorganic synergist which is preferably antimony trioxide, wherein the bromine content of the polyethylene is preferably not more than 7% (w/w) and the concentration of said inorganic additive is preferably not more than 4,% (w/w), forms another aspect of the invention. Preferably, the flammability of the pallet is reduced using the ternary or quaternary mixtures described above. It should be noted, however, that the aforementioned polyethylene compositions may be used for preparing various articles other than pallets.

EXAMPLES

Materials

In the following examples, a flame retardant is sometimes abbreviated FR. The various materials used for preparing the compositions illustrated in the examples are described in Table 1:

Examples 1-3 (of the Inventions) and 4-5 (Comparative)

Cone Calorimeter Analysis of HDPE compositions which contain Bromine (Between 3.3 and 5%) and $Sb_2O_3$ (2%)

In Examples 1 to 3, the brominated flame retardant incorporated in the high density polyethylene was FR-1025, whereas in Examples 4 and 5, two commercially available flame retardants, FR-1210 and S-8010, respectively, were used.

Preparation of the Compositions

The ingredients were compounded according to the weight ratios indicated in Table 2 in a twin-screw co-rotating extruder ZE25 with L/D=32 with the temperature settings being between 20° C. and 200° C. The screw speed was 350 rpm, and the throughput 15 kg per hour. The strands produced were pelletized in a pelletizer 750/3 ex Accrapak, and then dried in a circulating air oven at 75° C. for 4 hours. The dried pellets were injection molded into test specimens using Allrounder 500-150 ex. Arburg. The conditions of the injection molding were as follows: 180-200-230-230-230° C., mold temperature was 30° C.

Flammability Test

Cone calorimeter analysis was conducted in order to evaluate the flammability of the compositions prepared. Data was collected by the cone calorimeter under a heat flux of 50 kW/m². The parameters which were investigated were the time to ignition, heat release rate (HRR), total heat release (THR) and the HRR peak.

In Table 2 below, the compositions prepared and the results of the flammability test are presented.

TABLE 1

| TRADE NAME (PRODUCER) | GENERAL DESCRIPTION | FUNCTION |
|---|---|---|
| HDPE Hostalen GH 7740 F3 (ex Basell) | High density polyethylene | plastic matrix |
| HDPE PE grade T50 400 (ex INEOS) | High density polyethylene | plastic matrix |
| FR-1025 (ICL-IP) | Poly (pentabromobenzyl acrylate) with molecular weight less than 5,000 g/mol | Polymeric FR |
| F-2016 (ICL-IP) | Brominated Epoxy Oligomer with average molecular weight 1600 g/mol | Polymeric FR |
| F-3020 (ICL-IP) | End capped brominated epoxy resin oligomers (average molecular weight 2000). | Polymeric FR |
| F-3100 (ICL-IP) | End capped brominated epoxy (average molecular weight 18000) | Polymeric FR |
| F-2400 (ICL-IP) | Brominated epoxy polymer (average molecular weight 40000) | Polymeric FR |
| FR-1210 (ICL-IP) | Decabromodiphenyl oxide | Non-polymeric FR |
| S-8010 (Albemarle Corporation) | Decabromodiphenyl ethane | Non-polymeric FR |
| L0112 (ex Kafrit) | Antimony trioxide masterbatch which contains 80 wt % $Sb_2O_3$ | FR-synergist |
| Irganox B-225 (ex Ciba) | | antioxidant |
| PE, grade G (ex Addcomp) | HDPE, extrusion grade | Plastic matrix |
| PEB 1150 ex Hubron from Kafrit | Black MB with 50% carbon black (50% SRF) | Pigment |
| EMA ex Arkema | Ethylene methyl acetate copolymer | Plastic matrix |
| Bondyram 7003 ex Polyram | Maleic anhydride modified polyolefin elastomer | Plastic matrix |

TABLE 2

| Composition (by weight %): | Example 1-3 FR type FR-1025 | | | Example 4 FR-1210 | Example 5 S-8010 |
|---|---|---|---|---|---|
| | 1 | 2 | 3 | | |
| HDPE | 92.6 | 91.6 | 90.2 | 93.2 | 93.2 |
| FR | 4.6 | 5.6 | 7.0 | 4.0 | 4.0 |
| LO 112 | 2.6 | 2.6 | 2.6 | 2.6 | 2.6 |
| Irganox B-225 | 0.2 | 0.2 | 0.2 | 0.2 | 0.2 |
| Bromine content, % calculated | 3.3 | 4.0 | 5.0 | 3.3 | 3.3 |
| Antimony trioxide, % calculated | 2.0 | 2.0 | 2.0 | 2.0 | 2.0 |
| Flammability test: Cone calorimeter | | | | | |
| Time to ignition (sec) | 55 | 55 | 56 | 62 | 61 |
| Total heat release (MJ/m$^2$) | 105 | 95 | 85 | 110 | 105 |
| Heat release rate (kW/m$^2$) | 450 | 515 | 465 | 580 | 605 |
| Peak of HRR (kW/m$^2$) | 1060 | 1000 | 990 | 1150 | 1260 |

The data collected by the cone calorimeter indicates that FR-1025 is more effective in reducing the flammability of HDPE at a low concentration of bromine and antimony trioxide synergist, as compared to FR-1210 and S-8010.

Examples 6-7 (of the Invention) and 8-9 (Comparative)

UL-94 Analysis and Mechanical Properties of HDPE Compositions which Contain Bromine (4%) and Sb$_2$O$_3$ (2%)

In Examples 6 and 7, F-2016 and FR-1025, respectively, were incorporated in the high density polyethylene. In Examples 8 and 9, FR-1210 and S-8010, respectively, were used as the flame retarding agents.

Preparation of the Compositions

The ingredients were compounded according to the weight ratios indicated in Table 3 in a twin-screw co-rotating extruder ZE25 with L/D=32 with the temperature settings being between 20° C. and 200° C. The screw speed was 350 rpm, and the throughput 15 kg per hour. The strands produced were pelletized in pelletizer 750/3, and then dried in a circulating air oven at 75° C. ° C. for 4 hours. The dried pellets were injection molded into test specimens by injection molding in Allrounder 500-150 ex. Arburg. The conditions of the injection molding were as follows: 180-200-230-230-230° C., mold temperature was 30° C.

Flammability Test

The flammability test was carried out according to the Underwriters-Laboratories standard UL 94, applying both the vertical burn and horizontal burn tests on specimens of 3.2 mm thickness. Briefly, in the UL 94 vertical burn test, two sets of five specimens are tested. A specimen is exposed vertically to a flame for 10 seconds. The specimen is ignited at the bottom and burns up. If the specimen self-extinguishes within 30 seconds, then the flame is reapplied for another ten seconds and then removed. Flaming droplets are allowed to fall on cotton located below the specimen. If the average burning time is less than 25 seconds but the droplets ignite the cotton, the material is classified as UL 94 V-2. Total flaming combustion time must not exceed 250 seconds for each set of specimens. Specimens must not burn with flaming or glowing combustion up to the specimen holding clamp.

Mechanical Properties

Impact strength was measured using the Izod notched test according to ASTM D-256-81. Tensile strength, elongation and modulus were measured in Zwick 1435 material testing machine according to ASTM D638-95.

The compositions of Examples 6-9, the results of the flammability tests and the representative mechanical properties of said compositions are tabulated in Table 3.

TABLE 3

| | Example | | | |
|---|---|---|---|---|
| | Example 6 | Example 7 FR type | Example 8 | Example 9 |
| | F-2016 | FR-1025 | FR-1210 | S-8010 |
| Composition (by weight %): | | | | |
| HDPE (PE grade T50 400 ex INEOS) | 89.2 | 91.6 | 92.4 | 92.3 |
| FR | 8.0 | 5.6 | 4.8 | 4.9 |
| LO 112 | 2.6 | 2.6 | 2.6 | 2.6 |
| Irganox B-225 | 0.2 | 0.2 | 0.2 | 0.2 |
| Properties | | | | |
| Bromine content, % calculated | 4 | 4 | 4 | 4 |
| Antimony trioxide, % calculated | 2.0 | 2.0 | 2.0 | 2.0 |
| Flammability test: UL-94 vertical burning test at 3.2 mm thickness | | | | |
| Maximum flaming time (sec) | 26 | 35 | 46 | 42 |
| Total flaming time (sec) | 118 | 128 | 173 | 206 |
| Number of specimens igniting cotton | 5 | 5 | 5 | 5 |
| Number of specimens burned up to the clamp | 0 | 0 | 0 | 0 |
| Rating | V-2 | HB | HB | HB |
| Flammability test: UL-94 horizontal burn test at 3.2 mm thickness | | | | |
| Self extinguishing before 25 mm | Yes | Yes | Yes | Yes |
| Mechanical properties: | | | | |
| Impact strength (Izod notched J/m) | 58.9 | 71.9 | 64.7 | 44.7 |
| Tensile strength (N/m$^2$) | 19.79 | 20.93 | 19.86 | 20.16 |
| Elongation at yield (%) | 8.42 | 9.92 | 11.15 | 11.04 |
| Elongation at break (%) | 69 | 68 | 72 | 68 |
| Tensile Modulus (N/m$^2$) | 993 | 1028 | 954 | 964 |

According to the UL-94 vertical burn test, the formulation which contains F-2016 is V-2 rated at 3.2 mm thickness. All the other formulations subjected to the UL-94 vertical burn test are BB-rated; still, the formulation which contains FR-1025 has been found to exhibit reduced flammability as compared to the formulations which are flame retarded by means of FR-1210 and S-8010. In addition, the FR-1025-containing formulation exhibits high impact strength, without any drop in the tensile modulus, as compared to the reference formulations of Examples 8 and 9.

Examples 10-16

Preparation of FR Master Batch Compositions

The flame retardants listed in Table 4 below were combined and processed to form master batch compositions in the form of pellets. The resulting pellets can be used to prepare the flame retarded polyolefin of the present invention.

TABLE 4

| | Example | | | | | | |
|---|---|---|---|---|---|---|---|
| | 10 % (w/w) | 11 % (w/w) | 12 % (w/w) | 13 % (w/w) | 14 % (w/w) | 15 % (w/w) | 16 % (w/w) |
| FR 1025 | 80 | 10 | 30 | 10 | 30 | 10 | 30 |
| F 2016 | | 70 | 50 | | | | |
| F 2400 | 20 | 20 | 20 | 20 | 20 | 20 | 20 |
| F 3020 | | | | 70 | 50 | | |
| F-3100 | | | | | | 70 | 50 |

The components as described in Table 4 were thoroughly mixed and fed to a Buss co-kneader that was heated to 160-200° C. The mixture was extruded and pelletized using die face pelletizer. The obtained master batch was in the form of dust free rounded pellets with 4 mm average diameter.

Examples 17 (of the Invention) and 18-20 (Comparative)

Quantitative Analysis of Blooming of HDPE Compositions Comprising Brominated Flame Retardants In example 17, the brominated flame retardant incorporated in the high density polyethylene was a quaternary mixture consisting of 10% FR-1025, 35% F-2016, 35% F-3100 and 20% F-2400, whereas in Examples 18 and 19, FR-1210 and S-8010, respectively, were used. No fire retardant was incorporated into the HDPE of Example 20, which was used as control.

Preparation of the Compositions

HDPE was fed via the polymer feeder to the main feeding port of the extruder. FR-s were fed via the powder feeder to the main feeding port of the extruder. Compounding was performed in a twin-screw co-rotating extruder ZE25 with L/D=32 ex Berstorff. The extruded strands were pelletized in pelletizer 750/3 ex Accrapak systems limited. The obtained pellets were dried in a circulating air oven ex Heraeus instruments at 75° C. for 4 hours. The compounding conditions are presented in Table 5A.

TABLE 5A

| PARAMETER | UNITS | Set values | Read values |
|---|---|---|---|
| Screws | | Medium shear A | Medium shear A |
| Feeding zone temperature ($T_1$) | ° C. | no heating | no heating |
| $T_2$ | ° C. | 20 | 47-51 |
| $T_3$ | ° C. | 20 | 79-88 |
| $T_4$ | ° C. | 140 | 159-163 |
| $T_5$ | ° C. | 190 | 186-193 |
| $T_6$ | ° C. | 190 | 191-195 |
| $T_7$ | ° C. | 190 | 191-195 |
| $T_8$ | ° C. | 190 | 198-205 |
| $T_9$ | ° C. | 200 | 201-208 |
| Temperature of melt | ° C. | | 196-206 |

TABLE 5A-continued

| PARAMETER | UNITS | Set values | Read values |
|---|---|---|---|
| Screw speed | RPM | 360 | |
| Feeding rate | Kg/h | 20 | |
| Amperage | A | | 13-11 |

Test specimens were prepared by injection molding in Allrounder 500-150 ex. Arburg. The injection molding conditions are presented in Table 5B.

TABLE 5B

| Regime of injection molding in Arburg 320S Allrounder 500-150 | | |
|---|---|---|
| PARAMETER | UNITS | Set values |
| $T_1$ (Feeding zone) | ° C. | 200 |
| $T_2$ | ° C. | 210 |
| $T_3$ | ° C. | 210 |
| $T_4$ | ° C. | 210 |
| $T_5$ (nozzle) | ° C. | 220 |
| Mold temperature | ° C. | 30 |
| Injection pressure | bar | 900 |
| Holding pressure | bar | 1000 |
| Back pressure | bar | 300 |
| Holding time | sec | 4 |
| Cooling time | sec | 20 |
| Mold closing force | kN | 500 |
| Filling volume (portion) | ccm | 25 |
| Injection speed | ccm/sec | 7 |
| Mold | | N° S 18570 |

The HDPE compositions prepared and tested are presented in Table 5C. The quaternary mixture of FR's is sometimes identified herein as "polyquel".

TABLE 5C

| | Example | | | |
|---|---|---|---|---|
| | Example 17 | Example 18 | Example 19 | Example 20 |
| | FR type | | | |
| | Quaternary mixture | FR-1210 | S-8010 | no FR |
| Composition (by weight %): | | | | |
| HDPE (PE grade G ex Addcomp) | 85.7 | 88.5 | 88.4 | 96 |
| FR | 7.6 | 4.8 | 4.9 | 0 |
| LO 112 | 2.5 | 2.5 | 2.5 | 0 |
| Irganox B-225 | 0.2 | 0.2 | 0.2 | 0 |
| PEB 1150 | 4 | 4 | 4 | 4 |
| Properties | | | | |
| Bromine content, % calculated | 4 | 4 | 4 | 0 |
| Antimony trioxide, % calculated | 2.0 | 2.0 | 2.0 | 0 |

Blooming Analysis

The compositions were tested for surface migration of the flame retardants ("blooming") under severe storage conditions as follows. Having completed the preparation of the samples as described above, bloomed flame retardants were swept from the surfaces of the samples. The samples were then maintained in a circulating air oven at 70° C. for either 15 days or 34 days.

Bloomed flame retardants were removed from the surfaces of the heated samples immediately after taking them out of the oven by sweeping the surface four times, using a filter paper suitable for Schoniger procedure, and then another four times using a fresh filter. The two filters obtained from each sample were placed in a platinum basket, flamed and burned in oxygen atmosphere. The gases of combustion were collected by 20 mL aliquots of water.

The bromide concentrations in the solutions obtained were analyzed by ion chromatography using. Dionex Ion Chromatograph DX-300. The following conditions were employed: column: AS9HC+AG9HC, mobile phase: 9 mM $Na_2CO_3$, flow rate: 1 mL/min, injection volume: 100 μL, temperature: ambient.

The blooming (BL) was calculated according to the following equation: $BL(\mu g/cm^2)=C*V/S$, wherein C is the bromide concentration in the solution, V is the solution volume and S is the area of the sample surface. Hence, the blooming is expressed in terms of amount of bromine per surface unit area.

Based on the previous study, the recoveries of FR-1210, S-8010 and Polyquel were calculated to be 90%, 95% and 94% correspondingly. Limit of Quantitation (LOQ) of blooming of bromine was calculated to be 0.23 μg/cm².

Figure 1:
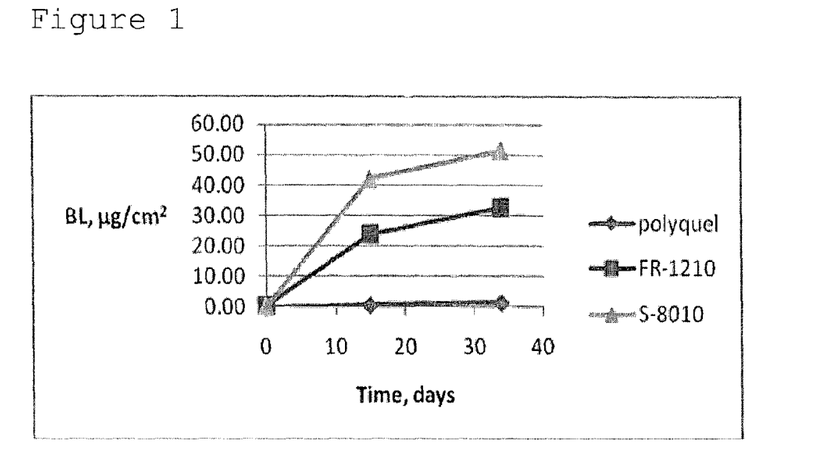
FIG. 1 is a graphical representation, showing the degree of migration of several flame retardants to the surface of HDPE during a storage period of 34 days under severe conditions.

The blooming of brominated fire retardants on the surface of high density polyethylene as a function of time is depicted in FIG. 1. Blooming of the quaternary mixture of the invention, comprising a combination of high molecular weight brominated epoxy polymers, poly(pentabromobenzyl acrylate) and a low-molecular weight brominated epoxy resin of Formula (I), was 1.43±0.15 μg/cm² after 34 days at 70° C. Both S-8010 and FR-1210 bloomed more than a magnitude of order higher than the fire retardant mixture of the invention.

Figure 2:
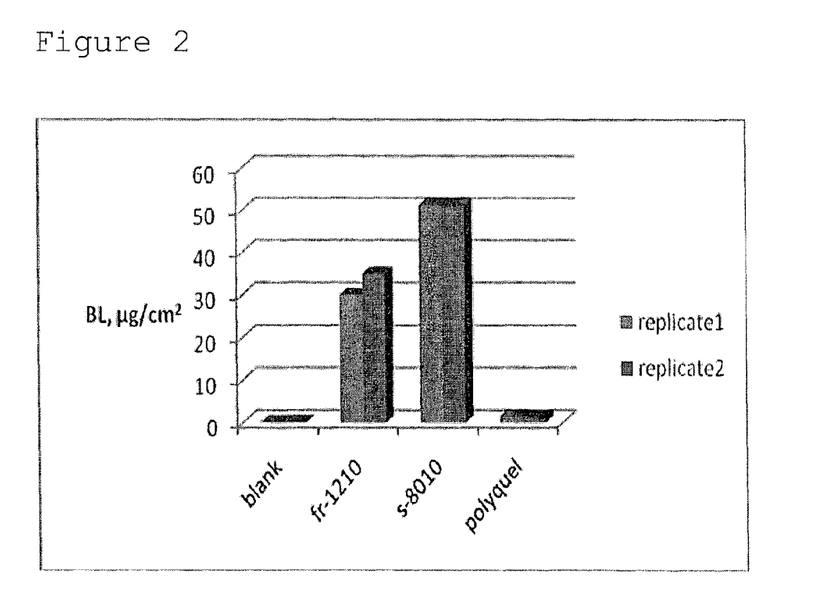
FIG. 2 is a bar diagram showing the degree of migration of several flame retardants to the surface of HDPE after a storage period of 34 days under severe conditions.

The degree of migration of the flame retardants to the surface of the polymer in each of the eight tested samples measured at the end of 34 days storage period, is illustrated in FIG. 2 in the form of a bar diagram. It is apparent that the quaternary mixture of Example 17 is virtually a non-blooming flame retardant, as opposed to S-8010 and FR-1210, which exhibit a relatively high degree of blooming.

Examples 21-22

UL-94 Analysis and Mechanical Properties of HDPE Compositions which Contain Bromine (4%) and $Sb_2O_3$ (2%)

In Examples 21 and 22, quaternary mixtures of brominated flame retardant identified in Table 6 below were incorporated into the high density polyethylene in the form of powder mixtures.

TABLE 6

| | Example | |
|---|---|---|
| | 21 | 22 |
| F 2400 % (w/w) | 25 | 31.67 |
| F 2016 % (w/w) | 25 | 31.67 |
| F 3100 % (w/w) | 25 | 31.67 |
| FR-1025 % (w/w) | 25 | 5 |
| Bromine content, % calculated | 56.5 | 53.0 |

Preparation of the HDPE Compositions

The FR mixtures of Table 6 were compounded with the ingredients specified in Table 7 in a twin-screw co-rotating extruder ZE25 with L/D=32 with the temperature settings being between 20° C. and 220° C. The screw speed was 350 rpm. The strands produced were pelletized in a pelletizer 750/3 ex. Accrapak, and then dried in a circulating air oven at 75° C. for 4 hours. The dried pellets were injection molded into test specimens using Allrounder 500-150 ex. Arburg. The conditions of the injection molding were as follows: 190-200-210-210-230° C., mold temperature was 30° C. The specimens were conditioned at 23° C. for 168 hours before testing.

Flammability Test

The flammability test was carried out according to the Underwriters-Laboratories standard UL 94, applying both the vertical burn and horizontal burn tests on specimens of 3.2 mm thickness. The test conditions are described in detail in Examples 6-9 hereinabove.

Mechanical Properties

Impact strength was measured using the Izod notched test according to ASTM D-256-81. Tensile strength, elongation and modulus were measured in Zwick 1435 material testing machine according to ASTM D638-95.

The HDPE compositions of Examples 21-22, the results of the flammability tests and the representative mechanical properties of said compositions are tabulated in Table 7, together with a reference example which relates to the neat HDPE matrix.

TABLE 7

| | FR of Example 21 | FR of Example 22 | Reference |
|---|---|---|---|
| Composition (by weight %): | | | |
| HDPE (PE grade T50 400 ex INEOS) | 90 | 90 | 100 |
| FR | 7.04 | 7.55 | |
| LO 112 | 2.5 | 2.5 | |
| Irganox B-225 | 0.2 | 0.2 | |
| Properties | | | |
| Bromine content, % calculated | 4 | 4 | |
| Antimony trioxide, % calculated | 2 | 2 | |
| Flammability test: | | | |
| Calculated linear burning rate mm/min | 16.2 | 17.7 | 20 |
| Flames pass 100 mm marks | yes | yes | yes |
| Rating | HB | HB | HB |
| Mechanical properties: | | | |
| Impact strength (Izod notched J/m) | 59 | 65 | 122 |
| Tensile strength (N/mm²) | 22.6 | 22.6 | 22.2 |
| Elongation at break (%) | 236 | 214 | 277 |
| Tensile Modulus (N/mm²) | 1047 | 1031 | 1004 |

Despite having been incorporated into the HDPE matrix at very low concentrations, supplying bromine content of only 4% of the total weight of the HDPE composition, the quaternary mixtures of the invention, consisting of bromine-containing polymeric flame retardants, improve the flammability characteristics of HDPE and maintain satisfactory mechanical properties. It is noted that the HDPE compositions exhibit relatively high elongation at break, which is indicative of their usefulness in the production of pallets, where good resistance to breakage is considered important for prolonging service life.

Examples 23-26

UL-94 Analysis and Mechanical Properties of HDPE Compositions which Contain Bromine (4%) and $Sb_2O_3$ (2%)

The following examples illustrate that the quaternary mixtures of the invention, consisting of a pair of low molecular weight bromine-containing polymers (FR 1025 and F-2016) and a pair of high molecular weight bromine-containing polymers (F-3100 and F-2400), as set forth in Table 6 above, can be processed into masterbatch in the form of pellets, optionally together with a carrier, and then compounded with the HDPE matrix to give HDPE compositions with improved fire resistance and good mechanical properties.

Preparation of FR Masterbatch Compositions

The quaternary mixtures of flame retardants listed in Table 8 below were used to prepare masterbatch pellets, with or without a carrier.

TABLE 8

|  | Example | | | |
|---|---|---|---|---|
|  | 23 | 24 | 25 | 26 |
| Carrier type | none | EMA | BondyRam 7003 | BondyRam 7003 |
| Carrier % (w/w) | 0 | 5 | 5 | 5 |
| F-2400 % (w/w) | 25 | 23.75 | 23.75 | 30 |
| F-2016 % (w/w) | 25 | 23.75 | 23.75 | 30 |
| F-3100 % (w/w) | 25 | 23.75 | 23.75 | 30 |
| FR-1025 % (w/w) | 25 | 23.75 | 23.75 | 5 |
| Bromine content, % calculated | 56.8 | 53.9 | 53.9 | 50.4 |

The components identified in Table 8 were compounded in a twin-screw co-rotating extruder ZE25 with L/D=32 ex. Berstorrf vented at 7 zone, with the temperature settings being between 20° C. and 200° C. The screw speed was 350 rpm. The strands produced were pelletized in pelletizer 750/3 ex. Accrapak, and then dried in a circulating air oven at 75° C. ° C. for 4 hours. The masterbatch compositions were obtained in the form of dust free pellets.

Preparation of Fire Retarded HDPE Compositions

The FR masterbatch compositions of Table 8 were compounded with the ingredients specified in Table 9 in a twin-screw co-rotating extruder ZE25 with L/D=32 with the temperature settings being between 20° C. and 220° C. The screw speed was 350 rpm. The strands produced were pelletized in a pelletizer 750/3 ex. Accrapak, and then dried in a circulating air oven at 75° C. for 4 hours. The dried pellets were injection molded into test specimens using Allrounder 500-150 ex. Arburg. The conditions of the injection molding were as follows: 190-200-210-210-230° C., mold temperature was 30° C. The specimens were conditioned at 23° C. for 168 hours before testing.

Flammability Test

The flammability test was carried out according to the Underwriters-Laboratories standard UL 94, applying both the vertical burn and horizontal burn tests on specimens of 3.2 mm thickness. The test conditions are described in detail in Examples 6-9 hereinabove.

Mechanical Properties

Impact strength was measured using the Izod notched test according to ASTM D-256-81. Tensile strength, elongation and modulus were measured in Zwick 1435 material testing machine according to ASTM D638-95.

The compositions of Examples 23-26, the results of the flammability tests and the representative mechanical properties of said compositions are tabulated in Table 9. The Reference Example, which reports the properties of the pure HDPE, is included in Table 7.

TABLE 9

|  | FR of Ex. 23 | FR of Ex. 24 | FR of Ex. 25 | FR of Ex. 26 |
|---|---|---|---|---|
| Composition (by weight %): | | | | |
| HDPE (PE grade T50 400 ex INEOS) | 90 | 90 | 90 | 90 |
| FR | 7.04 | 7.42 | 7.42 | 7.55 |
| LO 112 | 2.5 | 2.5 | 2.5 | 2.5 |
| Irganox B-225 | 0.2 | 0.2 | 0.2 | 0.2 |
| Properties | | | | |
| Bromine content, % calculated | 4 | 4 | 4 | 4 |
| Antimony trioxide, % calculated | 2 | 2 | 2 | 2 |
| Flammability test: | | | | |
| Calculated linear burning rate mm/min | 12.0 | 14.3 | 15.8 | 14.3 |
| Flames pass 100 mm marks | yes | yes | yes | yes |
| Rating | HB | HB | HB | HB |
| Mechanical properties: | | | | |
| Impact strength (Izod notched J/m) | 71 | 63 | 64 | 57 |
| Tensile strength (N/mm²) | 22.8 | 22.4 | 22.5 | 22.5 |
| Elongation at break (%) | 208 | 211 | 242 | 218 |
| Tensile Modulus (N/mm²) | 989 | 964 | 979 | 1049 |

The masterbatch route offers a convenient production method, affording HDPE compositions with improved flammability properties when compared to the neat HDPE. The mechanical properties of the resultant HDPE compositions are also satisfactory. The high elongation at break, which is important for the application of HDPE composition in the preparation of pallet structures, is especially noted.

The invention claimed is:

1. A polyethylene composition comprising high density polyethylene, a mixture of flame retardants which are bromine-containing polymers, and an inorganic flame retardant synergist, said mixture of flame retardants comprising:
   (a) poly(pentabromobenzyl acrylate);
   (b) low molecular weight brominated epoxy resin of Formula (Ia):

wherein m, the number average degree of polymerization, is between 0.4 and 7.2;
   c) high molecular weight brominated epoxy resin of Formula (Ia):

-continued wherein m, the weight average degree of polymerization, is between 24 and 115; and (d) high molecular weight tribromophenol end-capped resin of Formula (Ib):

wherein m, the weight average degree of polymerization, is between 10 and 80.

2. The polyethylene composition according to claim 1, wherein the bromine content of the composition is between 1% and 7% (w/w) and the concentration of the inorganic synergist is not more than 4% (w/w).

3. The polyethylene composition according to claim 1, wherein the inorganic flame retardant synergist is antimony trioxide.

4. A process for preparing the polyethylene composition of claim 1, comprising:
   forming a masterbatch comprising said mixture of flame retardants and optionally said inorganic flame retardant synergist; and
   compounding said masterbatch with said high density polyethylene and with said inorganic flame retardant synergist if not present in the masterbatch.

5. The process of claim 4, comprising:
   forming a masterbatch comprising said mixture of flame retardants, an inert polymer carrier, and optionally said inorganic flame retardant synergist; and
   compounding said masterbatch with said high density polyethylene and with said inorganic flame retardant synergist if not present in the masterbatch;
   wherein the inert polymer carrier is compatible with said high density polyethylene and said inorganic flame retardant synergist.

6. The process of claim 4, comprising:
   forming a masterbatch comprising said mixture of flame retardants; and
   compounding said masterbatch with said high density polyethylene and said inorganic flame retardant synergist.

7. Pallets comprising at least one structural unit made of the polyethylene composition according to claim 1.

8. A concentrate comprising:
   (a) poly(pentabromobenzyl acrylate);
   (b) low molecular weight brominated epoxy resin of Formula (Ia):

wherein m, the number average degree of polymerization, is between 0.4 and 7.2;

(c) high molecular weight brominated epoxy resin of Formula (Ia):

wherein m, the weight average degree of polymerization, is between 24 and 115; and (d) high molecular weight tribromophenol end-capped resin of Formula (Ib):

wherein m, the weight average degree of polymerization, is between 10 and 80;

said concentrate being in the form of pellets with a bromine content of not less than 15% by weight.

* * * * *